(12) United States Patent
Miyake et al.

(10) Patent No.: US 7,407,725 B2
(45) Date of Patent: Aug. 5, 2008

(54) NON-AQUEOUS ELECTROLYTE SECONDARY CELL

(75) Inventors: Masahide Miyake, Kobe (JP); Masahisa Fujimoto, Osaka (JP); Hideyuki Koga, Kobe (JP); Hisaki Tarui, Kobe (JP); Shin Fujitani, Kobe (JP); Masaharu Itaya, Kobe (JP)

(73) Assignee: Sanyo Electric Co., Ltd., Moriguchi (JP)

( * ) Notice: Subject to any disclaimer, the term of this patent is extended or adjusted under 35 U.S.C. 154(b) by 684 days.

(21) Appl. No.: 10/487,213

(22) PCT Filed: Oct. 21, 2002

(86) PCT No.: PCT/JP02/10901

§ 371 (c)(1), (2), (4) Date: Feb. 19, 2004

(87) PCT Pub. No.: WO03/036751

PCT Pub. Date: May 1, 2003

(65) Prior Publication Data

US 2004/0241543 A1 Dec. 2, 2004

(30) Foreign Application Priority Data

Oct. 25, 2001 (JP) ............................. 2001-327418
Apr. 26, 2002 (JP) ............................. 2002-125662

(51) Int. Cl.
*H01M 6/04* (2006.01)
*H01M 4/58* (2006.01)

(52) U.S. Cl. ..................... 429/201; 429/218.1; 429/245

(58) Field of Classification Search .............. 429/218.1, 429/245, 201
See application file for complete search history.

(56) References Cited

U.S. PATENT DOCUMENTS

| | | | |
|---|---|---|---|
| 4,537,843 A * | 8/1985 | Shishikura et al. | 429/339 |
| 6,025,457 A | 2/2000 | Ohno et al. | |
| 6,280,883 B1 * | 8/2001 | Lamanna et al. | 429/307 |
| 6,350,545 B2 * | 2/2002 | Fanta et al. | 429/307 |
| 6,432,585 B1 * | 8/2002 | Kawakami et al. | 429/233 |
| 6,855,457 B2 * | 2/2005 | Miyake et al. | 429/188 |
| 2004/0038127 A1 * | 2/2004 | Schlaikjer | 429/199 |

FOREIGN PATENT DOCUMENTS

| | | |
|---|---|---|
| JP | 10-199524 | 7/1998 |
| JP | 10-265673 | 10/1998 |
| JP | 11-297355 | 10/1999 |
| JP | 11-306858 | 11/1999 |
| JP | 11-329495 | 11/1999 |
| JP | 2000-16983 | 1/2000 |
| JP | 2000012088 A * | 1/2000 |
| JP | 2000-082494 | 3/2000 |
| JP | 2000-228223 | 8/2000 |

(Continued)

*Primary Examiner*—Tracy Dove
(74) *Attorney, Agent, or Firm*—Westerman, Hattori, Daniels & Adrian, LLP.

(57) ABSTRACT

In a non-aqueous electrolyte secondary cell including a positive electrode, a negative electrode and a non-aqueous electrolyte, the negative electrode includes a material capable of absorbing or releasing lithium and wherein the non-aqueous electrolyte contains a room-temperature molten salt having a melting point of 60° C. or less and a lithium salt.

11 Claims, 13 Drawing Sheets

FOREIGN PATENT DOCUMENTS

| | | |
|---|---|---|
| JP | 2001-210315 | 8/2001 |
| JP | 2001-210319 | 8/2001 |
| JP | 2002-110230 | 4/2002 |
| JP | 2002-110231 | 4/2002 |
| JP | 2002-251917 | 9/2002 |
| JP | 2002-324579 | 11/2002 |
| WO | WO 01/86748 | 11/2001 |

* cited by examiner

NON-AQUEOUS ELECTROLYTE SECONDARY CELL

TECHNICAL FIELD

The present invention relates to a non-aqueous electrolyte secondary cell or more particularly, to a non-aqueous electrolyte secondary cell enhanced in safety characteristics by improving a non-aqueous electrolyte thereof.

BACKGROUND ART

As one of modern secondary cells of high output and high energy density, a non-aqueous electrolyte secondary cell has come into use, the cell employing a non-aqueous electrolyte and offering a high electromotive force based on oxidization and reduction of lithium.

Such a non-aqueous electrolyte secondary cell generally employs a non-aqueous electrolyte wherein a solute of lithium salt, such as $LiBF_4$ or $LiPF_6$, is dissolved in an organic solvent such as ethylene carbonate or diethyl carbonate.

Unfortunately, the aforesaid organic solvent for use in the non-aqueous electrolyte is flammable, involving a fear of burning in abnormal operation such as overcharge. Hence, it has been a conventional practice in the art to provide a protection circuit such as to prevent the cell from being overcharged. This leads to a problem of cost increase.

DISCLOSURE OF THE INVENTION

The invention is directed to solution to the aforementioned problem of the non-aqueous electrolyte secondary cell. Specifically, the invention has an object to provide a non-aqueous electrolyte secondary cell improved in the non-aqueous electrolyte thereof so as to eliminate the fear of burning in the abnormal operation such as overcharge as well as to ensure that the cell may be used safely despite the omission of the protection circuit.

According to the invention, a non-aqueous electrolyte secondary cell including a positive electrode, a negative electrode and a non-aqueous electrolyte, the cell is characterized in that the negative electrode includes a material capable of absorbing or releasing lithium and wherein the non-aqueous electrolyte contains a room-temperature molten salt having a melting point of 60° C. or less and a lithium salt.

Where the non-aqueous electrolyte containing the room-temperature molten salt having the melting point of 60° C. or less and the lithium salt is used as suggested by the non-aqueous electrolyte secondary cell of the invention, the above lithium salt provides lithium ions transferred between the positive electrode and the negative electrode so as to effect the charge/discharge process. The aforesaid room-temperature molten salt is a liquid consisting only of ions, having no vapor pressure and having nonflammable nature. Therefore, the room-temperature molten salt is not decomposed nor caused to burn during the abnormal operation such as overcharge. Furthermore, this salt is not caused to burn by oxygen radical. That is, this salt ensures a safe use of the cell which is not provided with the protection circuit. Where the lithium salt is added to the room-temperature molten salt as described above, a melting point of the resultant mixture is thought to be decreased from that of each of the salts so that the mixture is maintained in a liquid state.

What is required of the above room-temperature molten salt is to assume the liquid state in a wide temperature range as mixed with the lithium salt. In general, a usable room-temperature molten salt may be in liquid state at temperatures in the range of −20° C. to 60° C. and may preferably have a conductivity of $10^{-4}$ S/cm or more. The above room-temperature molten salt may preferably have a base reducing potential and a noble oxidizing potential. Since a working potential of a negative electrode capable of inserting/releasing Li ions is generally in the range of 0.5-0V (vs.$Li/Li^+$), the room-temperature molten salt may preferably have a reducing potential of not more than 0V (vs.$Li/Li^+$). On the other hand, the higher oxidizing potential is the more preferred but in the light of the event of overcharge, the oxidizing potential of this salt may preferably be not less than 5V (vs.$Li/Li^+$) or more preferably be not less than 5.5V (vs.$Li/Li^+$).

Examples of a salt usable as such a room-temperature molten salt include quaternary ammonium salts and imidazolium salts. Specifically, the usable room-temperature molten salt may include at least one selected from the group consisting of trimethylpropylammonium•bis(trifluoromethylsulfonyl)imide$(CH_3)_3N^+(C_3H_7)N^-(CF_3SO_2)_2$, trimethyloctylammonium•bis(trifluoromethylsulfonyl)imide$(CH_3)_3N^+(C_8H_{17})N^-(CF_3SO_2)_2$, trimethylallylammonium•bis(trifluoromethylsulfonyl)imide $(CH_3)_3N^+(allyl)N^-(CF_3SO_2)_2$, trimethylhexylammonium•bis(trifluoromethylsulfonyl)imide$(CH_3)_3N^+(C_6H_{13})N^-(CF_3SO_2)_2$, trimethylethylammonium•2,2,2-trifluoro-N-(trifluoromethyls ulfonyl)acetamide $(CH_3)_3N^+(C_2H_5)$ $(CF_3CO)N^-(CF_3SO_2)$, trimethylallylammonium•2,2,2-trifluoro-N-(trifluoromethyls ulfonyl)acetamide$(CH_3)_3N^+(allyl)(CF_3CO)N^-$ $(CF_3SO_2)$, trimethylpropylammonium•2,2,2-trifluoro-N-(trifluoromethyl sulfonyl)acetamide$(CH_3)_3N^+(C_3H_7)$ $(CF_3CO)N^-(CF_3SO_2)$, tetraethylammonium•2,2,2-trifluoro-N-(trifluoromethylsulfo nyl)acetamide$(C_2H_5)_4N^+(CF_3CO)$ $N^-(CF_3SO_2)$, triethylmethylammonium•2,2,2-trifluoro-N-(trifluoromethyls ulfonyl)acetamide$(C_2H_5)_3N^+(CH_3)$ $(CF_3CO)N^-(CF_3SO_2)$ and 1-ethyl-3-methylimidazolium•2,2,2-trifluoro-N-(trifluorome thylsulfonyl)acetamide$(C_2H_5)$ $(C_3H_3N_2)^+(CH_3)(CF_3CO)N^-(CF_3SO_2)$.

On the other hand, lithium salts commonly used in the conventional non-aqueous electrolyte secondary cell maybe used as the lithium salt to be mixed with such a room-temperature molten salt. For example, the usable lithium salt include at least one selected from the group consisting of $LiBF_4$, $LiPF_6$, $LiCF_3SO_3$, $LiC_4F_9SO_3$, $LiN(CF_3SO_2)_2$, $LiN(C_2F_5SO_2)_2$, $LiN(CF_3SO_2)(COCF_3)$ and $LiAsF_6$.

In the non-aqueous electrolyte secondary cell according to the invention, a lithium containing oxide may be used as a material for the positive electrode thereof. The lithium containing oxide may include those commonly used in the conventional non-aqueous electrolyte secondary cell. An aluminum or tantalum foil capable of withstanding high potential may be used as a positive electrode collector in the positive electrode.

In the non-aqueous electrolyte secondary cell of the invention, a carbon material such as graphite which absorbs or releases lithium may be used as a material for the negative electrode thereof. For the purpose of obtaining a non-aqueous electrolyte secondary cell of high energy density, it is particularly desirable to employ silicon having a great capacity as suggested in Japanese Patent Application Nos. 2000-321300 and 2000-321201 filed by the present applicant. In a case where a silicon with copper diffused therein is used, the electrode is reduced in stress associated with the lithium absorption so that the cell is improved in the cycle performance. A negative electrode collector in the negative electrode may employ a copper foil. For the purpose of increasing adhesion to the negative electrode material, it is particularly preferred to employ a copper foil with its surface roughened by electrolysis.

BEST MODES FOR CARRYING OUT THE INVENTION

A non-aqueous electrolyte secondary cell according to the invention will hereinbelow be described in details with reference to the accompanying drawings. It is to be noted that the non-aqueous electrolyte secondary cell of the invention is not limited by those illustrated in the following examples and may be practiced in modifications thereof as required so long as such modifications do not deviate from the scope of the invention.

EXAMPLE 1

Example 1 used a non-aqueous liquid electrolyte as the non-aqueous electrolyte thereof, the liquid electrolyte prepared by dissolving $LiN(CF_3SO_2)_2$ as a lithium salt in trimethyloctylammonium•bis(trifluoromethylsulfonyl) imide$(CH_3)_3N^+(C_8H_{17})N^-(CF_3SO_2)_2$ as a room-temperature molten salt in concentrations of 1 mol/l. The non-aqueous liquid electrolyte had a conductivity of 0.111 mS/cm at 25° C. which was sufficient for carrying out the charge/discharge process.

A negative electrode was prepared as follows. A copper foil with its surface electrolytically treated was subjected to a sputtering process for forming thereon a thin film of amorphous silicon and then was cut into a size of 2 cm×2 cm.

Figure 1:
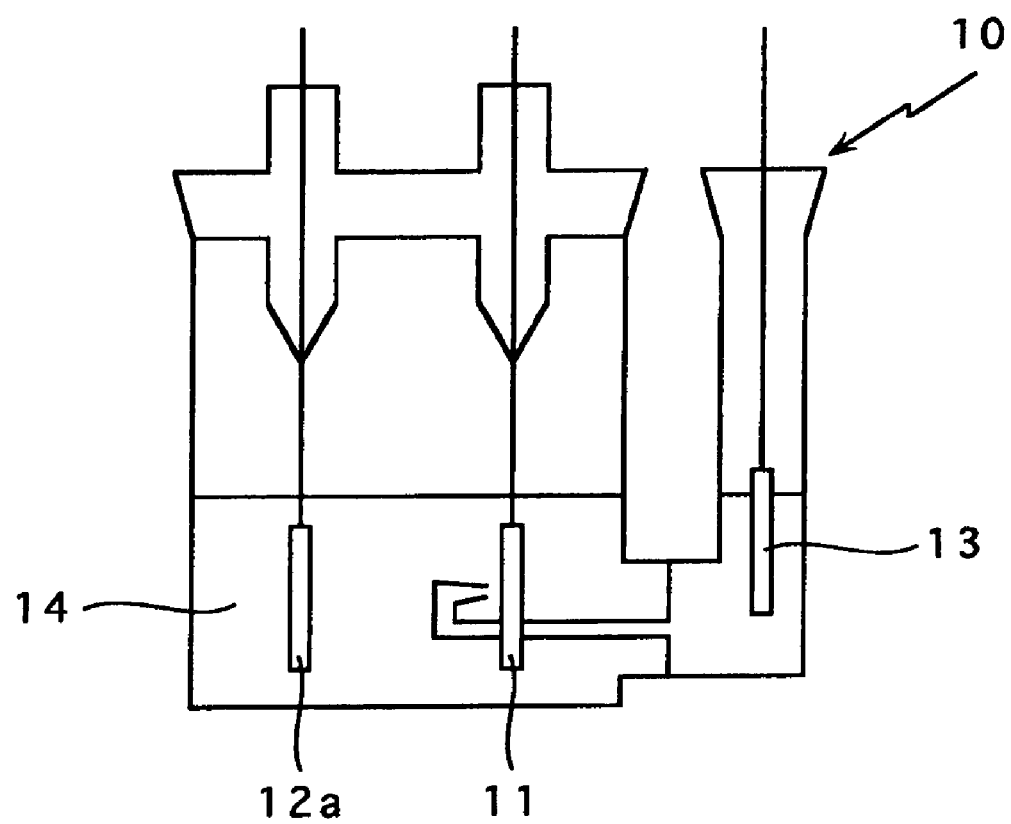
FIG. 1 is a diagram schematically illustrating a test cell fabricated in Examples 1 to 5 of the invention.

A test cell of Example 1 was fabricated as follows. As shown in FIG. 1, the aforesaid non-aqueous liquid electrolyte 14 was poured into a test cell vessel 10. On the other hand, the aforesaid negative electrode 11 was used as a working electrode whereas lithium metal pieces were used as a positive electrode 12a as a counter electrode and a reference electrode 13.

Figure 2:
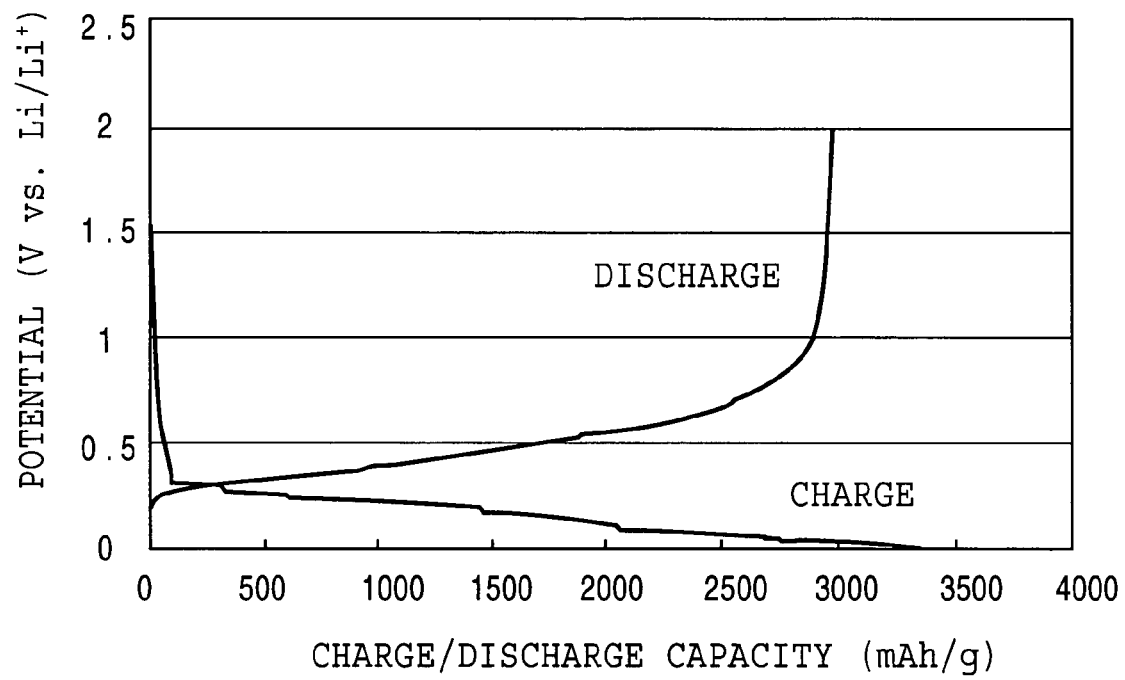
FIG. 2 is a graph representing a relation between the potential and the capacity of a negative electrode versus a reference electrode in the first charge-discharge cycle of the test cell of Example 1.

The resultant test cell was charged at a current density of 0.025 mA/cm$^2$ until the potential of the negative electrode 11 versus the reference electrode 13 reached 0.0V (vs.Li/Li$^+$). Thereafter, the cell was discharged at a current density of 0.025 mA/cm$^2$ until the potential of the negative electrode 11 versus the reference electrode 13 reached 2.0V (vs.Li/Li$^+$). There was determined a relation between the potential and the capacity of the negative electrode 11 in the first charge-discharge cycle. The results are shown in FIG. 2.

According to the results, the negative electrode 11 of the test cell of Example 1 presented a cycle-1 charge capacity of 3346 mAh/g and a cycle-1 discharge capacity of 2976 mAh/g. The values were close to a theoretical capacity of 4200 mAh/g so that the test cell was charged/discharged with high capacities.

Figure 3:
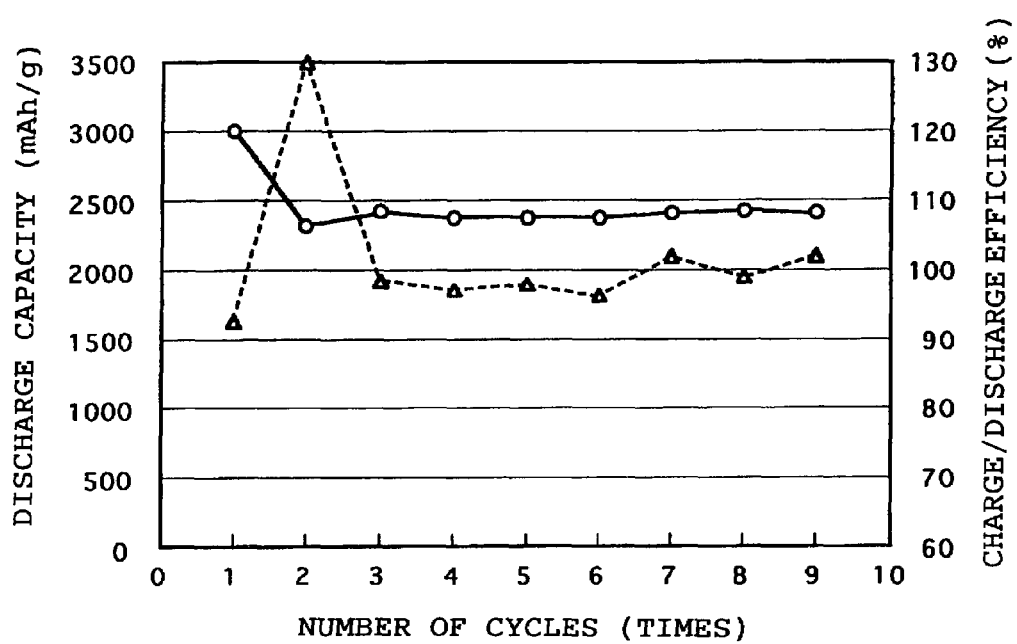
FIG. 3 is a graph representing a relation between the discharge capacity and the cycle number and a relation between the charge-discharge efficiency and the cycle number in each cycle of repeated charges and discharges of the test cell of Example 1.

The aforementioned charging and discharging of the test cell of Example 1 were repeated in cycles while a charge capacity Qa (mAh/g) and a discharge capacity Qb (mAh/g) of the cell were determined in each cycle. The charge-discharge efficiency (%) in each cycle was determined based on the following equation. The results are shown in FIG. 3. In FIG. 3, the discharge capacity (mAh/g) in each cycle is represented by a combination of a hollow circle and a solid line, whereas the charge-discharge efficiency (%) in each cycle is represented by a combination of a triangle and a broken line.

Charge-discharge efficiency (%)=($Qb/Qa$)×100

The results show that the test cell of Example 1 had high discharge capacities of about 2400 mAh/g in the second and the succeeding cycles. On the other hand, the charge-discharge efficiencies were also very high.

EXAMPLE 2

Example 2 used a non-aqueous liquid electrolyte as the non-aqueous electrolyte thereof, the liquid electrolyte prepared by dissolving $LiN(CF_3SO_2)_2$ as a lithium salt in trimethylpropylammonium•bis(trifluoromethylsulfonyl) imide$(CH_3)_3N^+(C_3H_7)N^-(CF_3SO_2)_2$ as a room-temperature molten salt in concentrations of 0.3 mol/l. The non-aqueous liquid electrolyte had a conductivity of 2.75 mS/cm at 25° C. which was sufficient for carrying out the charge/discharge process.

A test cell of Example 2 was fabricated the same way as in Example 1, except that the resultant non-aqueous liquid electrolyte was used.

Figure 4:
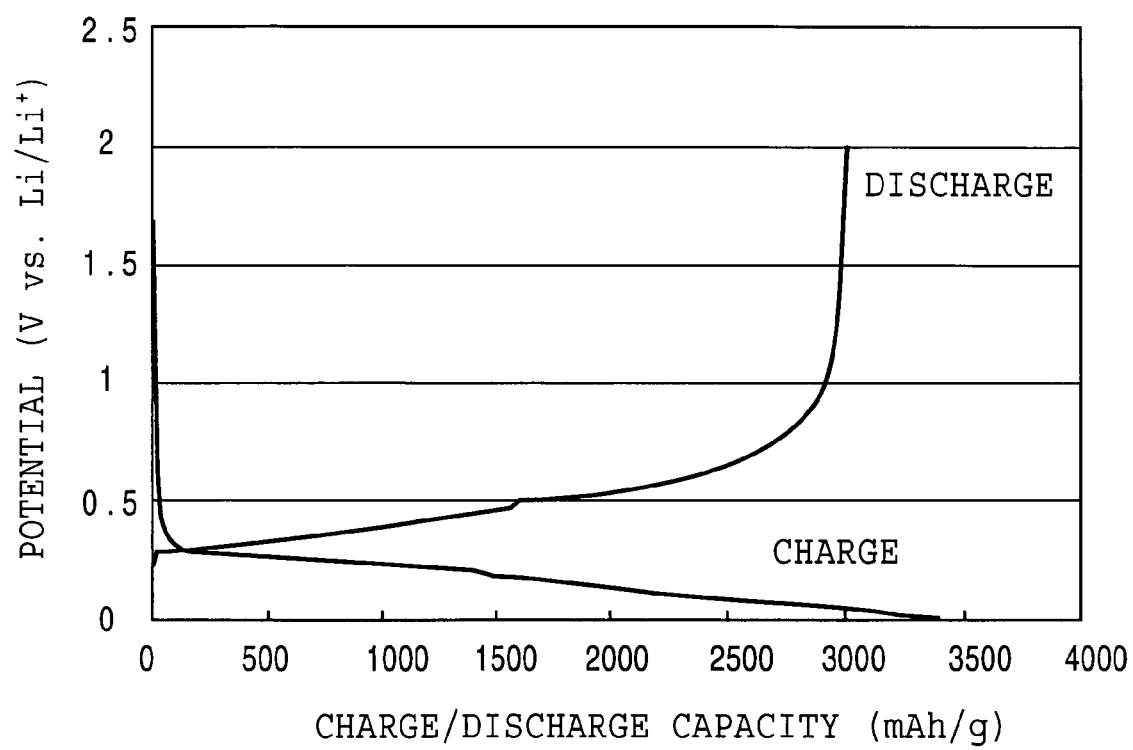
FIG. 4 is a graph representing a relation between the potential and the capacity of a negative electrode versus a reference electrode in the first charge-discharge cycle of the test cell of Example 2.

Subsequently, the resultant test cell was charged at a current density of 0.025 mA/cm$^2$ until the potential of the negative electrode 11 versus the reference electrode 13 reached 0.0V (vs.Li/Li$^+$). Thereafter, the cell was discharged at a current density of 0.025 mA/cm$^2$ until the potential of the negative electrode 11 versus the reference electrode 13 reached 2.0V (vs.Li/Li$^+$). There was determined a relation between the potential and the capacity of the negative electrode 11 in the first charge-discharge cycle. The results are shown in FIG. 4.

According to the results, the negative electrode 11 of the test cell of Example 2 presented a cycle-1 charge capacity of 3370 mAh/g and a cycle-1 discharge capacity of 2989 mAh/g. The values were close to the theoretical capacity of 4200 mAh/g so that the test cell was charged/discharged with high capacities.

Figure 5:
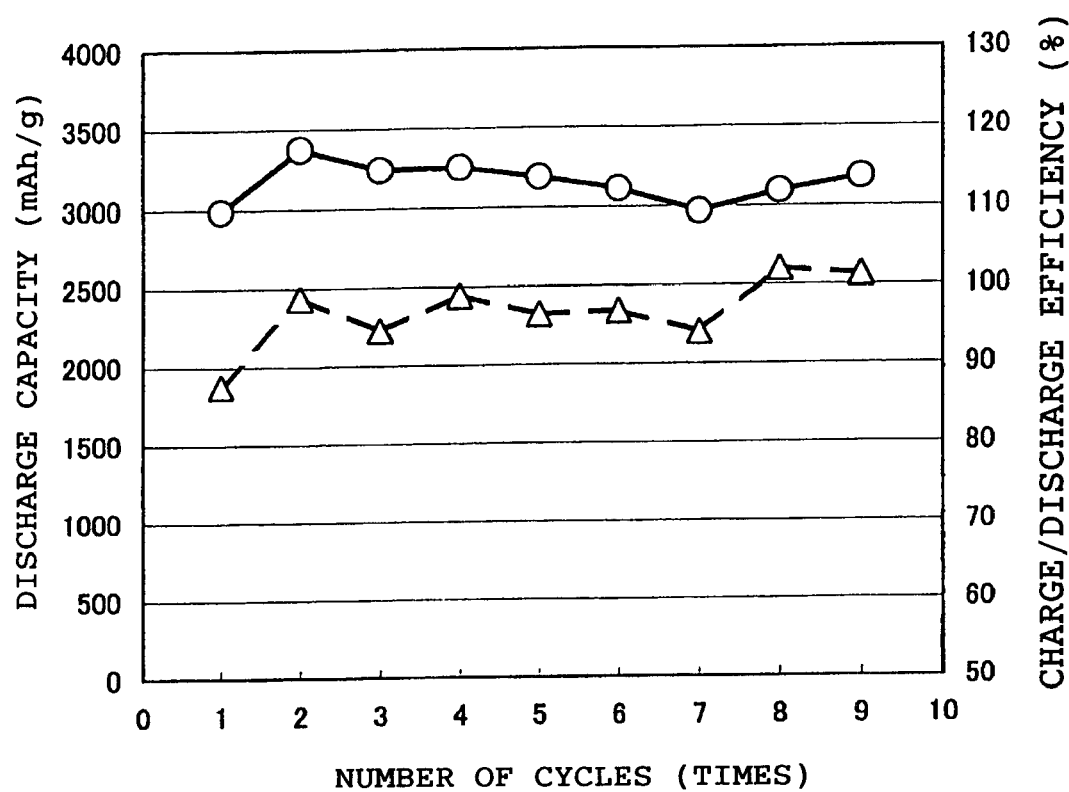
FIG. 5 is a graph representing a relation between the discharge capacity and the cycle number and a relation between the charge-discharge efficiency and the cycle number in each cycle of repeated charges and discharges of the test cell of Example 2.

The aforementioned charging and discharging of the test cell of Example 2 were repeated in cycles while a charge capacity Qa (mAh/g) and a discharge capacity Qb (mAh/g) in each cycle were determined. The charge-discharge efficiency (%) in each cycle was determined the same way as in Example 1. The results are shown in FIG. 5. In FIG. 5, the discharge capacity (mAh/g) in each cycle is represented by a combination of a hollow circle and a solid line, whereas the charge-discharge efficiency (%) in each cycle is represented by a combination of a triangle and a broken line.

The results show that the test cell of Example 2 achieved a high discharge capacity of 3183 mAh/g even at cycle 9. On the other hand, the charge-discharge efficiencies were also very high.

EXAMPLE 3

Example 3 used a non-aqueous liquid electrolyte as the non-aqueous electrolyte thereof, the liquid electrolyte prepared by dissolving LiN(CF$_3$SO$_2$)$_2$ as a lithium salt in trimethylhexylammonium•bis(trifluoromethylsulfonyl)imide(CH$_3$)$_3$N$^+$(C$_6$H$_{13}$)N$^-$(CF$_3$SO$_2$)$_2$ as a room-temperature molten salt in concentrations of 0.5 mol/l.

A test cell of Example 3 was fabricated the same way as in Example 1, except that the resultant non-aqueous liquid electrolyte was used.

Figure 6:
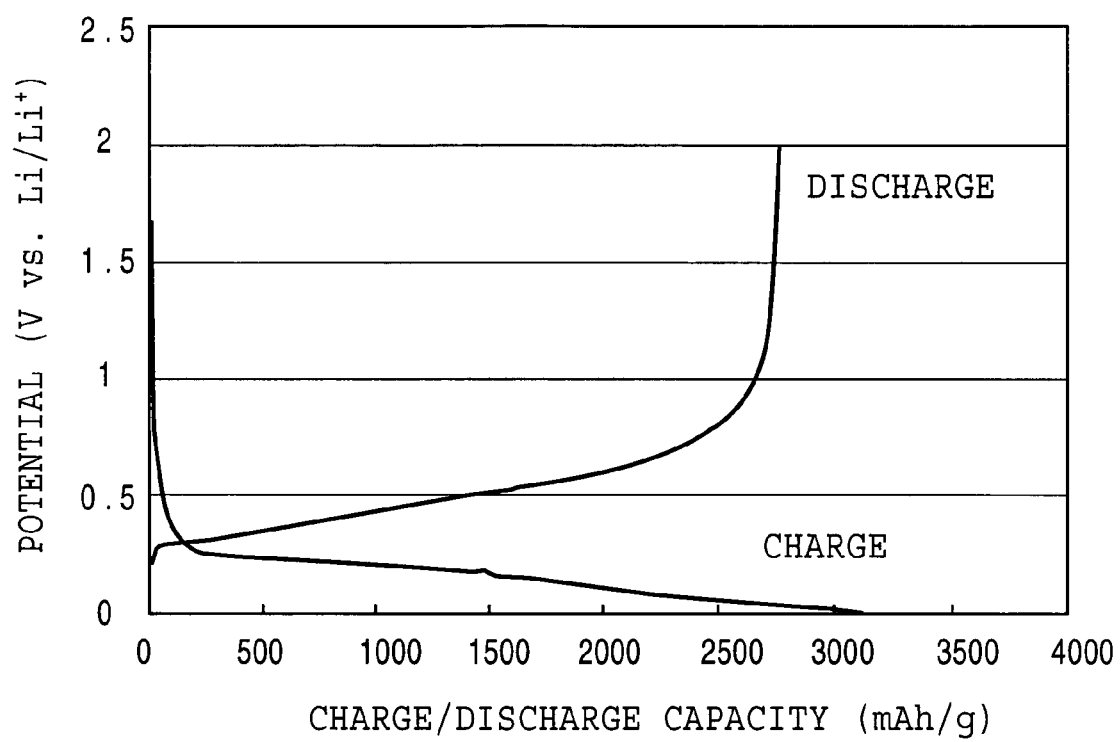
FIG. 6 is a graph representing a relation between the potential and the capacity of a negative electrode versus a reference electrode in the first charge-discharge cycle of the test cell of Example 3.

Subsequently, the resultant test cell was charged at a current density of 0.025 mA/cm$^2$ until the potential of the negative electrode 11 versus the reference electrode 13 reached 0.0V (vs.Li/Li$^+$). Thereafter, the cell was discharged at a current density of 0.025 mA/cm$^2$ until the potential of the negative electrode 11 versus the reference electrode 13 reached 2.0V (vs.Li/Li$^+$). There was determined a relation between the potential and the capacity of the negative electrode 11 in the first charge-discharge cycle. The results are shown in FIG. 6.

According to the results, the negative electrode 11 of the test cell of Example 3 presented a cycle-1 charge capacity of 3133 mAh/g and a cycle-1 discharge capacity of 2778 mAh/g. The values were close to the theoretical capacity of 4200 mAh/g so that the test cell was charged/discharged with high capacities.

Figure 7:
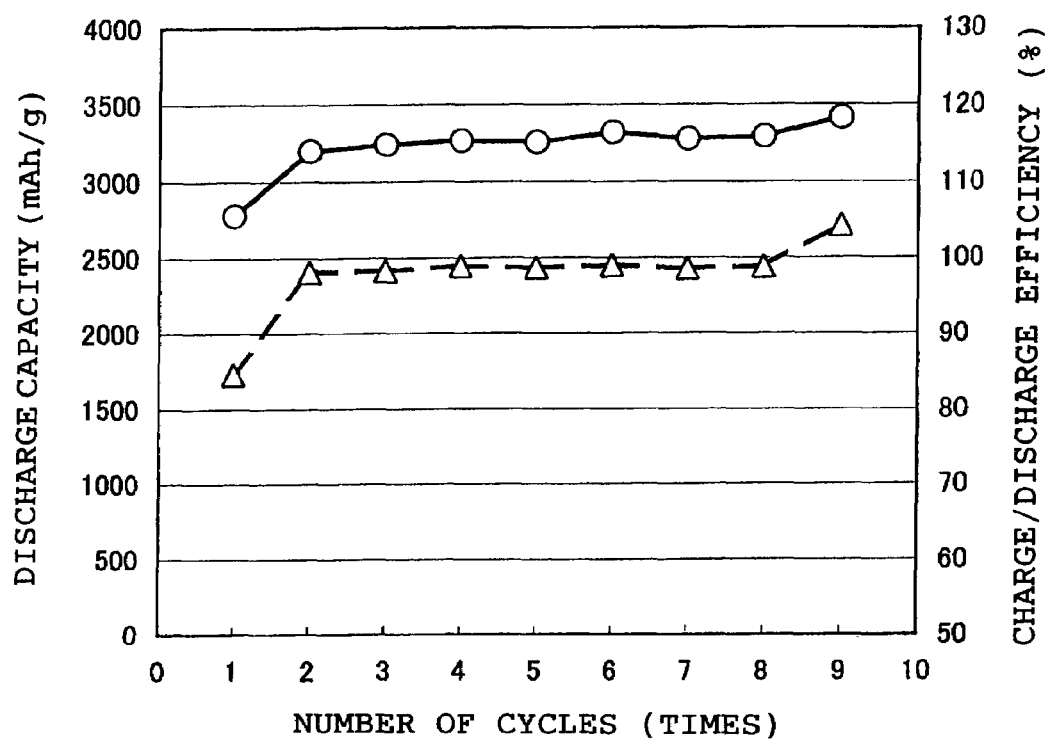
FIG. 7 is a graph representing a relation between the discharge capacity and the cycle number and a relation between the charge-discharge efficiency and the cycle number in each cycle of repeated charges and discharges of the test cell of Example 3.

The aforementioned charging and discharging of the test cell of Example 3 were repeated in cycles while a charge capacity Qa (mAh/g) and a discharge capacity Qb (mAh/g) in each cycle were determined. The charge-discharge efficiency (%) in each cycle was determined the same way as in Example 1. The results are shown in FIG. 7. In FIG. 7, the discharge capacity (mAh/g) at each cycle is represented by a combination of a hollow circle and a solid line, whereas the charge/discharge efficiency (%) at each cycle is represented by a combination of a triangle and a broken line.

The results show that the test cell of Example 3 achieved a high discharge capacity of 3411 mAh/g even at cycle 9. On the other hand, the charge-discharge efficiencies were also very high.

EXAMPLE 4

Example 4 used a non-aqueous liquid electrolyte as the non-aqueous electrolyte thereof, the liquid electrolyte prepared by dissolving LiN(CF$_3$SO$_2$)$_2$ as a lithium salt in triethylmethylammonium•2,2,2-trifluoro-N-(trifluoromethylsulfonyl)acetamide(C$_2$H$_5$)$_3$N$^+$(CH$_3$)(CF$_3$CO)N$^-$(CF$_3$SO$_2$) as a room-temperature molten salt in concentrations of 0.5 mol/l.

A test cell of Example 4 was fabricated the same way as in Example 1, except that the resultant non-aqueous liquid electrolyte was used.

Figure 8:
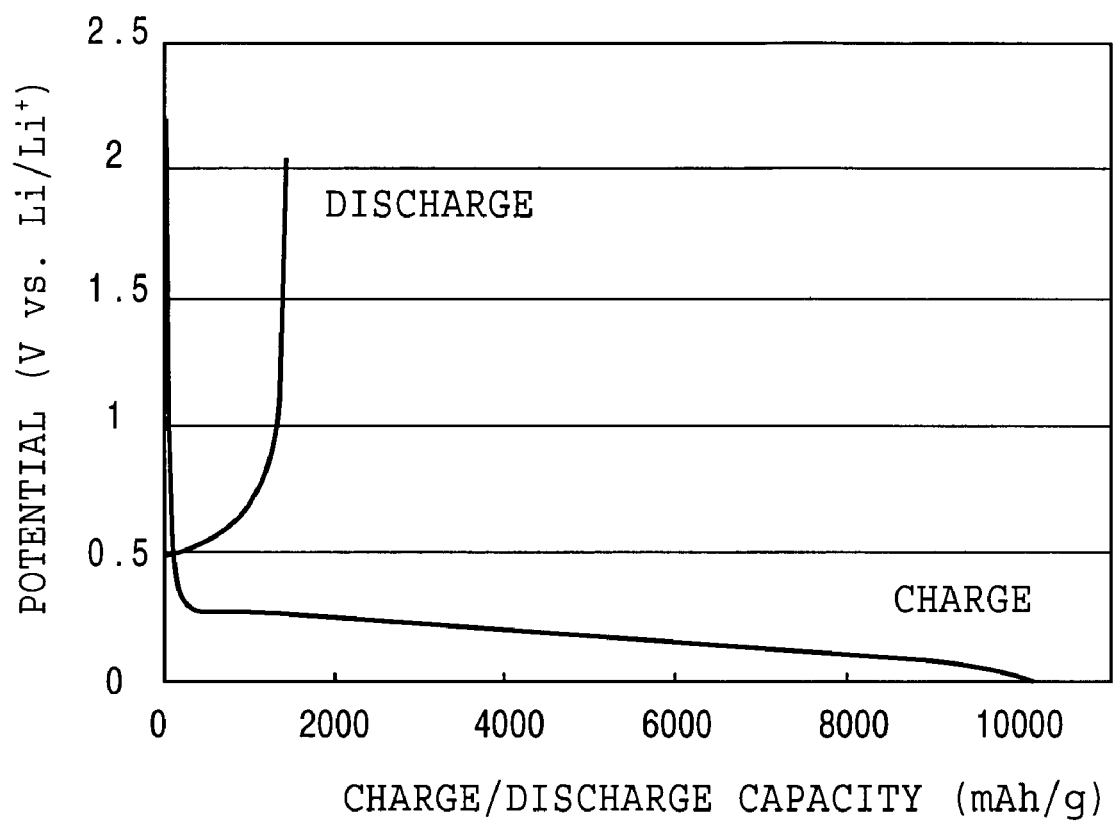
FIG. 8 is a graph representing a relation between the potential and the capacity of a negative electrode versus a reference electrode in the first charge-discharge cycle of the test cell of Example 4.

Subsequently, the resultant test cell was charged at a current density of 0.025 mA/cm$^2$ until the potential of the negative electrode 11 versus the reference electrode 13 reached 0.0V (vs.Li/Li$^+$). Thereafter, the cell was discharged at a current density of 0.025 mA/cm$^2$ until the potential of the negative electrode 11 versus the reference electrode 13 reached 2.0V (vs.Li/Li$^+$). There was determined a relation between the potential and the capacity of the negative electrode 11 in the first charge-discharge cycle. The results are shown in FIG. 8.

According to the results, the negative electrode 11 of the test cell of Example 4 presented a cycle-1 charge capacity of 10504 mAh/g and a cycle-1 discharge capacity of 1376 mAh/g. The test cell permitted the charging/discharging.

EXAMPLE 5

Example 5 used a non-aqueous liquid electrolyte as the non-aqueous electrolyte thereof, the liquid electrolyte prepared by dissolving LiN(CF$_3$SO$_2$)$_2$ as a lithium salt in 1-ethyl-3-methylimidazolium•2,2,2-trifluoro-N-(trifluoromethylsulfonyl)acetamide(C$_2$H$_5$)(C$_3$H$_3$N$_2$)$^+$(CH$_3$)(CF$_3$CO)N$^-$(CF$_3$SO$_2$) a room-temperature molten salt in concentrations of 0.5 mol/l.

A test cell of Example 5 was fabricated the same way as in Example 1, except that the resultant non-aqueous liquid electrolyte was used.

Figure 9:
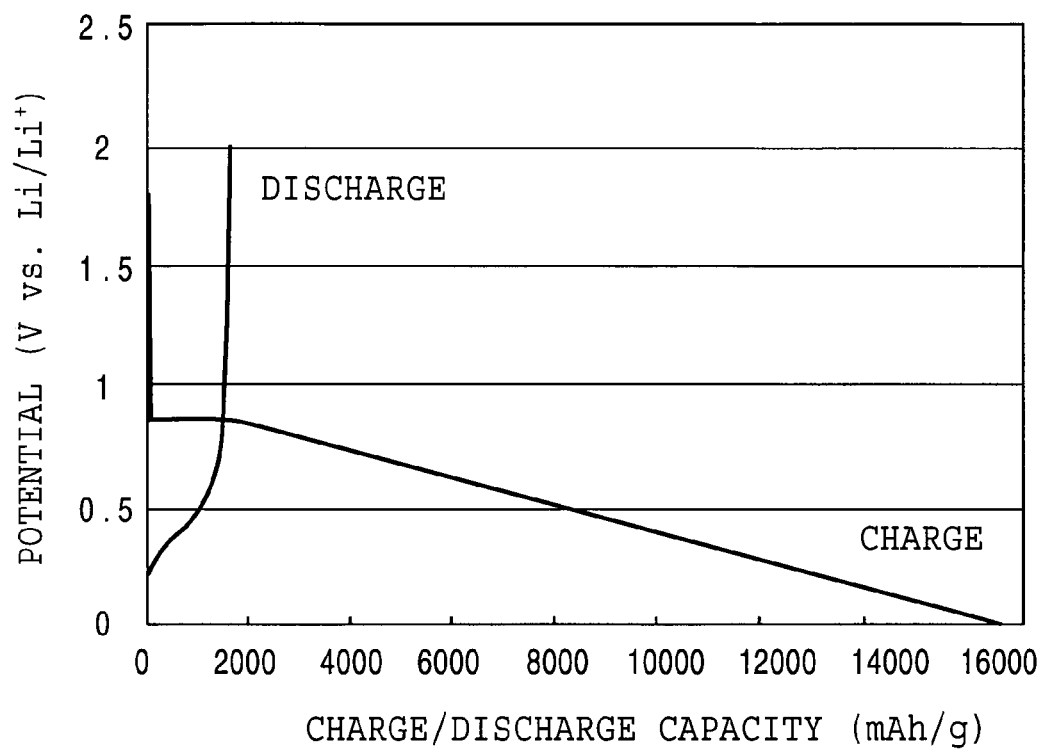
FIG. 9 is a graph representing a relation between the potential and the capacity of a negative electrode versus a reference electrode in the first charge-discharge cycle of the test cell of Example 5.

Subsequently, the resultant test cell was charged at a current density of 0.025 mA/cm$^2$ until the potential of the negative electrode 11 versus the reference electrode 13 reached 0.0V (vs.Li/Li$^+$). Thereafter, the cell was discharged at a current density of 0.025 mA/cm$^2$ until the potential of the negative electrode 11 versus the reference electrode 13 reached 2.0V (vs.Li/Li$^+$). There was determined a relation between the potential and the capacity of the negative electrode 11 in the first charge-discharge cycle. The results are shown in FIG. 9.

According to the results, the negative electrode 11 of the test cell of Example 5 presented a cycle-1 charge capacity of 16585 mAh/g and a cycle-1 discharge capacity of 1537 mAh/g. The test cell permitted the charging/discharging.

The results obtained by the foregoing Examples 1 to 5 suggest that the proper charge-discharge process may be performed by the non-aqueous electrolyte secondary cell fabricated using the negative electrode 11 employing silicon and the non-aqueous liquid electrolyte 14 prepared by dissolving the lithium salt of $LiN(CF_3SO_2)_2$ in the room-temperature molten salt of trimethyloctylammonium•bis(trifluoromethylsulfonyl)imide$(CH_3)_3N^+(C_8H_{17})N^-(CF_3SO_2)_2$, trimethylpropylammonium•bis(trifluoromethylsulfonyl)imide$(CH_3)_3N^+(C_3H_7)N^-(CF_3SO_2)_2$, trimethylhexylammonium•bis(trifluoromethylsulfonyl)imide$(CH_3)_3N^+(C_6H_{13})N^-(CF_3SO_2)_2$, triethylmethylammonium•2,2,2-trifluoro-N-(trifluoromethylsulfonyl)acetamide $(C_2H_5)_3N^+(CH_3)(CF_3CO)N^-(CF_3SO_2)$, or 1-ethyl-3-methylimidazolium•2,2,2-trifluoro-N-(trifluoromethylsulfonyl)acetamide$(C_2H_5)(C_3H_3N_2)^+(CH_3)(CF_3CO)N^-(CF_3SO_2)$.

EXAMPLE 6

In Example 6, a positive electrode was prepared as follows. A solution of N-methyl-2-pyrrolidone containing 5 wt % of polyvinylidene fluoride was added to powdered $LiCoO_2$ as a positive electrode material in a manner to provide a weight ratio of 95:5 between the powdered $LiCoO_2$ and polyvinylidene fluoride as a binder. The mixture was stirred in a stirrer for 30 minutes to form a slurry. The resultant slurry was applied to the both sides of an aluminum foil having a thickness of 20 μm using the doctor blade technique and then was dried.

As the non-aqueous electrolyte, the same non-aqueous liquid electrolyte as that of Example 1 was used, which was prepared by dissolving $LiN(CF_3SO_2)_2$ as a lithium salt in trimethyloctylammonium•bis(trifluoromethylsulfonyl)imide$(CH_3)_3N^+(C_8H_{17})N^-(CF_3SO_2)_2$ as a room-temperature molten salt in concentrations of 1 mol/l.

Figure 10:
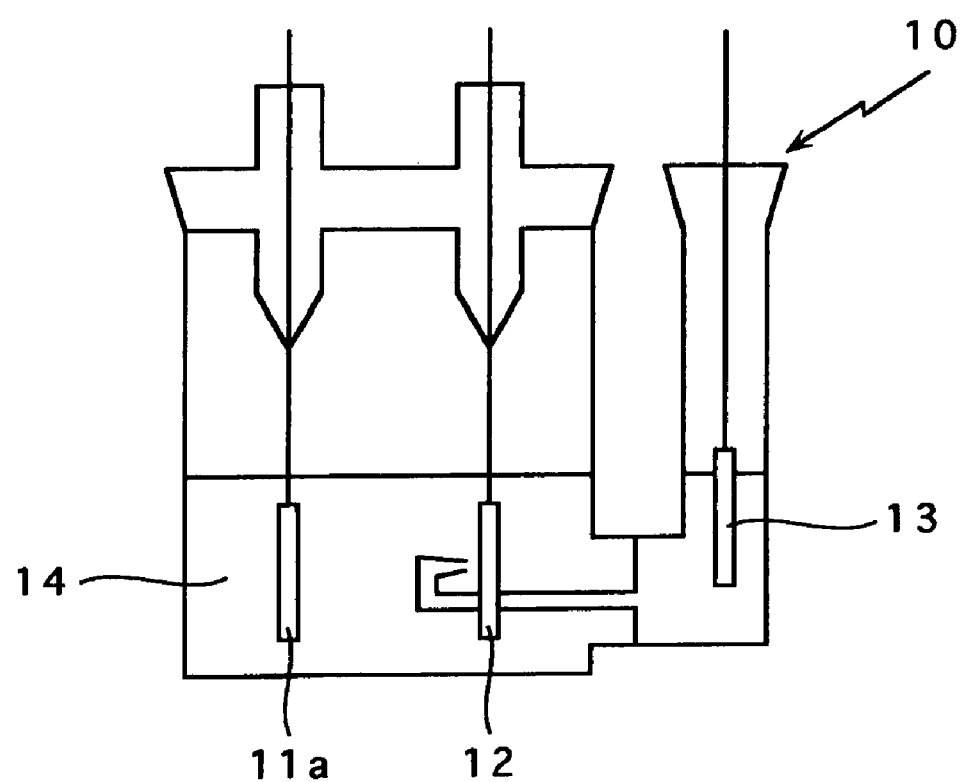
FIG. 10 is a diagram schematically illustrating a test cell fabricated in Examples 6 and 7 of the invention.

A test cell of Example 6 was fabricated as follows. As shown in FIG. 10, the resultant non-aqueous liquid electrolyte 14 was poured into a test cell vessel 10. On the other hand, the aforesaid positive electrode 12 was used as a working electrode whereas lithium metal pieces were used as a negative electrode 11a as a counter electrode and a reference electrode 13.

Figure 11:
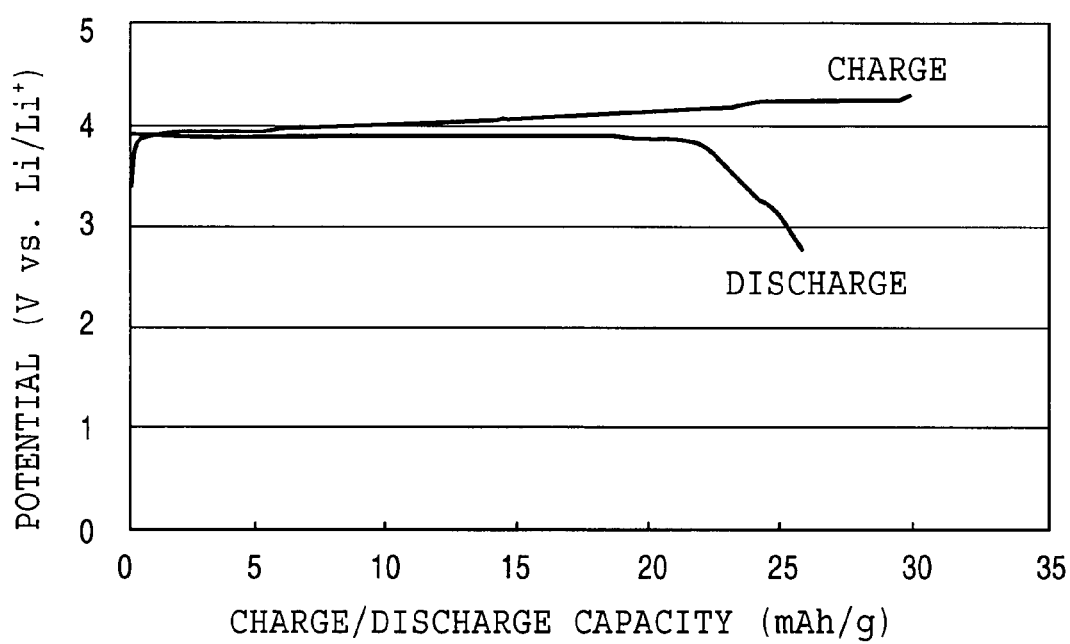
FIG. 11 is a graph representing a relation between the potential and the capacity of a negative electrode versus a reference electrode at initial charge and discharge of the test cell of example 6.

The resultant test cell was charged at a current density of 0.025 mA/cm² until the potential of the positive electrode 12 versus the reference electrode 13 reached 4.3V (vs.Li/Li⁺). Thereafter, the cell was discharged at a current density of 0.025 mA/cm² until the potential of the positive electrode 12 versus the reference electrode 13 reached 2.75V (vs.Li/Li⁺). There was determined a relation between the potential and the capacity of the positive electrode 12 initially charged and discharged. The results are shown in FIG. 11.

According to the results, the positive electrode 12 of the test cell of Example 6 presented an initial charge capacity of 29.8 mAh/g and an initial discharge capacity of 25.8 mAh/g. The test cell permitted the charging/discharging.

EXAMPLE 7

Example 7 used a positive electrode including an aluminum foil having an $LiCoO_2$ layer formed thereon by sputtering.

As the non-aqueous electrolyte, the same non-aqueous liquid electrolyte as that of Example 2 was used, which was prepared by dissolving $LiN(CF_3SO_2)_2$ as a lithium salt in trimethylpropylammonium•bis(trifluoromethylsulfonyl)imide$(CH_3)_3N^+(C_3H_7)N^-(CF_3SO_2)_2$ as a room-temperature molten salt in concentrations of 0.3 mol/l.

A test cell of Example 7 was fabricated the same way as in Example 6. That is, the resultant non-aqueous liquid electrolyte 14 was poured into a test cell vessel 10. On the other hand, the aforesaid positive electrode 12 was used as a working electrode whereas lithium metal pieces were used as a negative electrode 11a as a counter electrode and a reference electrode 13.

Figure 12:
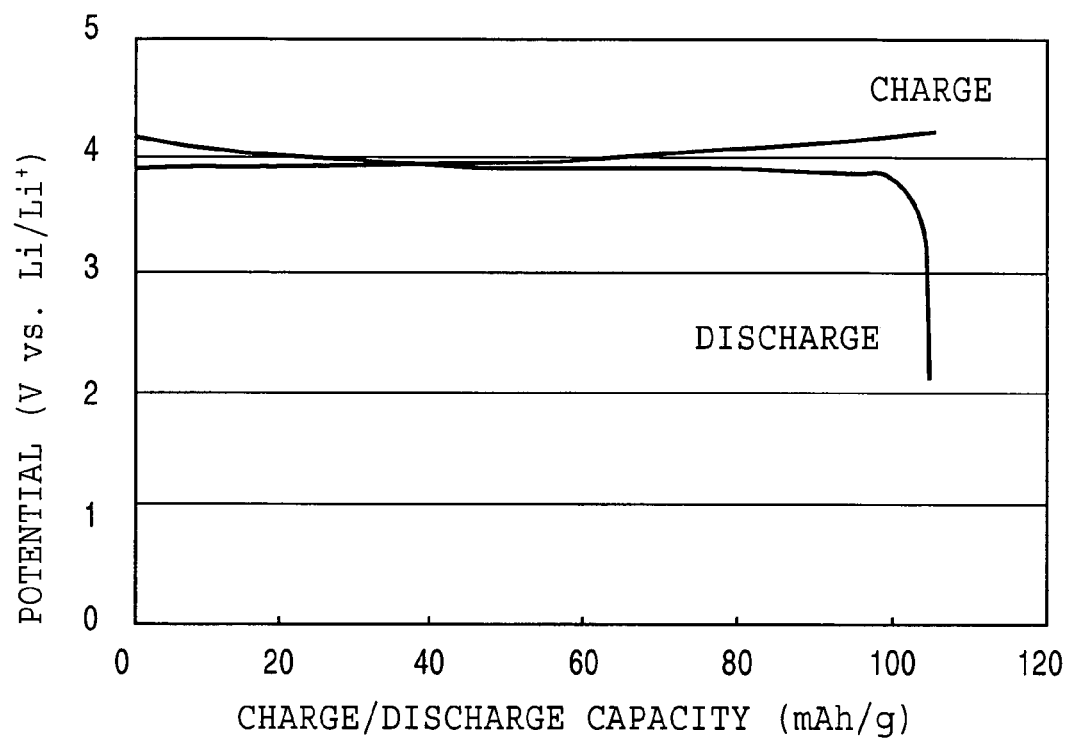
FIG. 12 is a graph representing a relation between the potential and the capacity of a negative electrode versus a reference electrode at initial charge and discharge of the test cell of Example 7.

Subsequently, the resultant test cell was charged at a current density of 0.025 mA/cm² until the potential of the positive electrode 12 versus the reference electrode 13 reached 4.2V (vs.Li/Li⁺). Thereafter, the cell was discharged at a current density of 0.025 mA/cm² until the potential of the positive electrode 12 versus the reference electrode 13 reached 2.0V (vs.Li/Li⁺). There was determined a relation between the potential and the capacity of the positive electrode 12 initially charged and discharged. The results are shown in FIG. 12.

According to the results, the positive electrode 12 of the test cell of Example 7 presented an initial charge capacity of 104 mAh/g and an initial discharge capacity of 104 mAh/g. The test cell permitted the charging/discharging.

Figure 13:
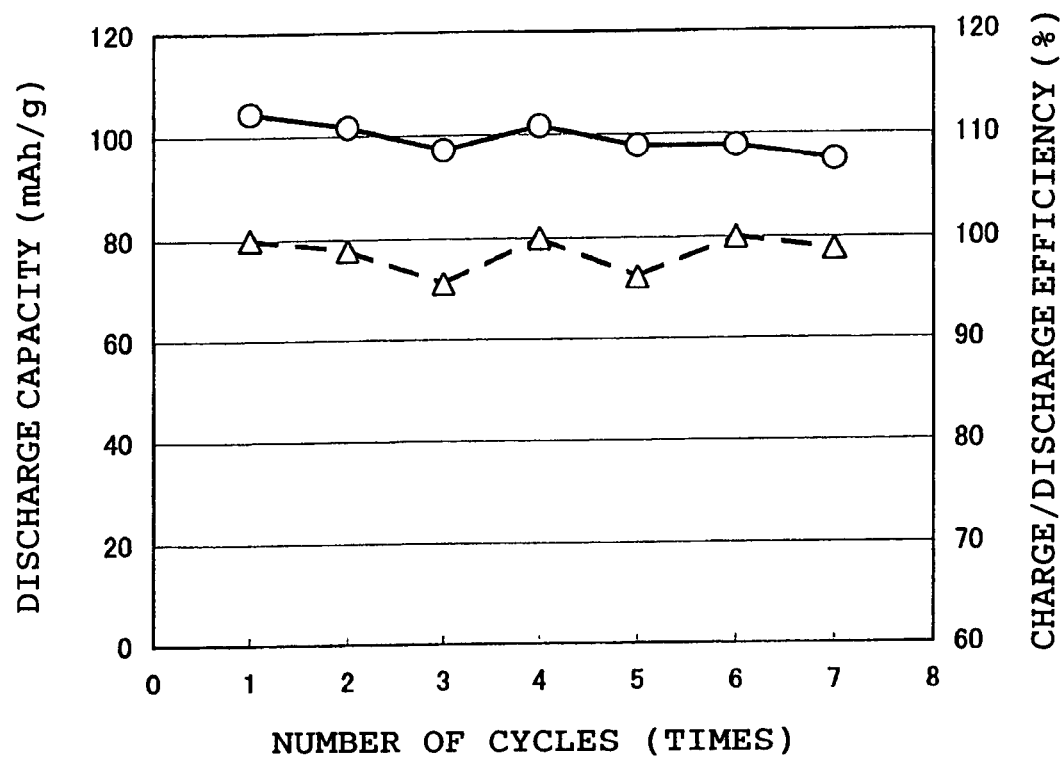
FIG. 13 is a graph representing a relation between the discharge capacity and the cycle number and a relation between the charge-discharge efficiency and the cycle number in each cycle of repeated charges and discharges of the test cell of Example 7.

In addition, the aforementioned charging and discharging of the test cell of Example 7 were repeated in cycles while a charge capacity Qa (mAh/g) and a discharge capacity Qb (mAh/g) in each cycle were determined. The charge-discharge efficiency (%) in each cycle was determined the same way as in Example 1. The results are shown in FIG. 13. In FIG. 13, the discharge capacity (mAh/g) in each cycle is represented by a combination of a hollow circle and a solid line, whereas the charge/discharge efficiency (%) in each cycle is represented by a combination of a triangle and a broken line.

The results show that the test cell of Example 7 achieved a high discharge capacity of 95 mAh/g even at cycle 7. On the other hand, the charge-discharge efficiencies were also very high.

The results obtained by the foregoing Examples 6 and 7 suggest that the proper charge/discharge may be performed by the non-aqueous electrolyte secondary cell fabricated using the positive electrode employing $LiCoO_2$ and the non-aqueous liquid electrolyte 14 prepared by dissolving the lithium salt of $LiN(CF_3SO_2)_2$ in the room-temperature molten salt of trimethyloctylammonium•bis(trifluoromethylsulfonyl)imide$(CH_3)_3N^+(C_8H_{17})N^-(CF_3SO_2)_2$, or trimethylpropylammonium•bis(trifluoromethylsulfonyl)imide$(CH_3)_3N^+(C_3H_7)N^-(CF_3SO_2)_2$.

In a case where the non-aqueous liquid electrolyte wherein the lithium salt of $LiN(CF_3SO_2)_2$ is dissolved in the room-temperature molten salt such as those illustrated in Examples 1 to 7 is used, the non-aqueous liquid electrolyte is prevented from being decomposed or caused to burn even in the abnormal operation such as overcharge.

INDUSTRIAL APPLICABILITY

As described above, the non-aqueous electrolyte secondary cell according to the invention employs the non-aqueous electrolyte containing the room-temperature molten salt having a melting point of 60° C. or less and the lithium salt. That is, the lithium salt provides lithium ions transferred between the positive electrode and the negative electrode for effecting the charge or discharge of the cell, while on the other hand, the non-aqueous electrolyte is prevented from being decomposed or caused to burn even in the abnormal operation such as overcharge. Thus, the secondary cell may be safely used despite the omission of the protective circuit.

The invention claimed is:

1. A non-aqueous electrolyte secondary cell comprising a positive electrode, a negative electrode and a non-aqueous electrolyte, wherein said negative electrode comprises a thin film consisting of silicon formed on a copper foil with its surface roughened and wherein the non-aqueous electrolyte consists essentially of a quaternary ammonium salt as a room-temperature molten salt having a melting point of 60° C. or less and a lithium salt.

2. The non-aqueous electrolyte secondary cell as claimed in claim 1, wherein said positive electrode comprises a lithium-containing oxide.

3. The non-aqueous electrolyte secondary cell as claimed in claim 1, wherein the lithium salt in said non-aqueous electrolyte is at least one of $LiBF_4$, $LiPF_6$, $LiCF_3SO_3$, $LiC_4F_9SO_3$, $LiN(CF_3SO_2)_2$, $LiN(C_2F_5SO_2)_2$, $LiN(CF_3SO_2)(COCF_3)$ and $LiAsF_6$.

4. The non-aqueous electrolyte secondary cell as claimed in claim 1, wherein a copper foil attained by electrolysis is used as said copper foil.

5. The non-aqueous electrolyte secondary cell as claimed in claim 1, wherein the quaternary ammonium salt as the room-temperature molten salt having the melting point of 60° C. or less in said non-aqueous electrolyte is at least one of trimethyipropylammonium•bis(trifluoromethylsulfonyl) imide, trimethyloctylammonium•bis(trifluoromethylsulfonyl)imide, trimethylallylammonium•bis(trifluoromethylsulfonyl)imide, trimethylhexylammonium•bis(trifluoromethylsulfonyl)imide, trimethylethylammonium•2,2,2-trifluoro-N-(trifluoromethylsulfonyl)acetamide trimethylallylammonium•2,2,2-trifluoro-N-(trifluoromethylsulfonyl)acetamide, trimethylpropylammonium•2,2,2-trifluoro-N-(trifluoromethylsulfonyl)acetamide, tetraethylammonium•2,2,2-trifluoro-N-(trifluoromethylsulfonyl) acetamide, and triethylmethylammonium•2,2,2-trifluoro-N-(trifluoromethylsulfonyl)acetamide.

6. The non-aqueous electrolyte secondary cell as claimed in claim 2, wherein the lithium salt in said non-aqueous electrolyte is at least one of $LiBF_4$, $LiPF_6$, $LiCF_3SO_3$, $LiC_4F_9SO_3$, $LiN(CF_3SO_2)_2$, $LiN(C_2F_5SO_2)_2$, $LiN(CF_3SO_2)(COCF_3)$ and $LiAsF_6$.

7. The non-aqueous electrolyte secondary cell as claimed in claim 2, wherein a copper foil attained by electrolysis is used as said copper foil.

8. The non-aqueous electrolyte secondary cell as claimed in claim 3, wherein a copper foil attained by electrolysis is used as said copper foil.

9. The non-aqueous electrolyte secondary cell as claimed in claim 2, wherein the quaternary ammonium salt as the room-temperature molten salt having the melting point of 60° C. or less in said non-aqueous electrolyte is at least one of trimethylpropylammonium•bis(trifluoromethylsulfonyl) imide, trimethyloctylammonium•bis(trifluoromethylsulfonyl)imide, trimethylallylammonium•bis(trifluoromethylsulfonyl)imide, trimethylhexylammonium•bis(trifluoromethylsulfonyl)imide, trimethylethylammonium•2,2,2-trifluoro-N-(trifluoromethylsulfonyl)acetamide, trimethylallylammonium•2,2,2-trifluoro-N-(trifluoromethylsulfonyl)acetamide, trimethylpropylammonium•2,2,2-trifluoro-N-(trifluoromethylsulfonyl)acetamide, tetraethylammonium•2,2,2-trifluoro-N-(trifluoromethylsulfonyl) acetamide, and triethylmethylammonium•2,2,2-trifluoro-N-(trifluoromethylsulfonyl)acetamide.

10. The non-aqueous electrolyte secondary cell as claimed in claim 3, wherein the quaternary ammonium salt as the room-temperature molten salt having the melting point of 60° C. or less in said non-aqueous electrolyte is at least one of trimethylpropylammonium•bis(trifluoromethylsulfonyl) imide, trimethyloctylammonium•bis(trifluoromethylsulfonyl)imide, trimethylallylammonium•bis(trifluoromethylsulfonyl)imide, trimethylhexylammonium•bis(trifluoromethylsulfonyl)imide, trimethylethylanimonium•2,2,2-trifluoro-N-(trifluoromethylsulfonyl)acetamide, trimethylallylammonium•2,2,2-trifluoro-N-(trifluoromethylsulfonyl)acetamide, trimethylpropylammonium•2,2,2-trifluoro-N-(trifluoromethylsulfonyl)acetamide, tetraethylammonium•2,2,2-trifluoro-N-(trifluoromethylsulfonyl) acetamide, and triethylmethylammonium•2,2,2-trifluoro-N-(trifluoromethylsulfonyl)acetamide.

11. The non-aqueous electrolyte secondary cell as claimed in claim 4, wherein the quaternary ammonium salt as the room-temperature molten salt having the melting point of 60° C. or less in said non-aqueous electrolyte is at least one of trimethylpropylammonium•bis(trifluoromethylsulfonyl) imide, trimethyloctylammonium•bis(trifluoromethylsulfonyl)imide, trimethylallylammonium•bis(trifluoromethylsulfonyl)imide, trimethylhexylammonium•bis(trifluoromethylsulfonyl)imide, trimethylethylammonium•2,2,2-trifluoro-N-(trifluoromethylsulfonyl)acetamide, trimethylallylammonium•2,2,2-trifluoro-N-(trifluoromethylsulfonyl)acetamide, trimethylpropylammonium•2,2,2-trifluoro-N-(trifluoromethylsulfonyl)acetamide, tetraethylammonium•2,2,2-trifluoro-N-(trifluoromethylsulfonyl) acetamide, and triethylmethylammonium•2,2,2-trifluoro-N-trifluoromethylsulfonyl)acetamide.

* * * * *